(12) United States Patent
Kim et al.

(10) Patent No.: US 8,054,757 B1
(45) Date of Patent: Nov. 8, 2011

(54) SYSTEM AND METHOD FOR EVALUATION OF NETWORK PERFORMANCE

(75) Inventors: John Y. Kim, Centreville, VA (US);
Thuy Tran, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 658 days.

(21) Appl. No.: 12/028,454

(22) Filed: Feb. 8, 2008

(51) Int. Cl.
*G01R 31/08* (2006.01)

(52) U.S. Cl. ......................................... 370/252; 370/250

(58) Field of Classification Search .................. 370/254, 370/241, 241.1, 250, 252, 389
See application file for complete search history.

(56) References Cited

U.S. PATENT DOCUMENTS

| | | | | |
|---|---|---|---|---|
| 7,489,678 B2* | 2/2009 | Aoyagi et al. | ................ | 370/352 |
| 7,760,660 B2* | 7/2010 | Conway | ........................ | 370/252 |
| 2003/0163558 A1* | 8/2003 | Cao et al. | ...................... | 709/223 |
| 2007/0189178 A1* | 8/2007 | Ottamalika et al. | .......... | 370/248 |

* cited by examiner

*Primary Examiner* — Derrick Ferris
*Assistant Examiner* — Peter Cheng

(57) ABSTRACT

Systems and methods are provided for evaluating an effect of a simulated communication network to media data. The method includes encoding media data to produce a plurality of packets, each packet being associated with a packet index number, a packet size and a packet transmission time. The packet index number, packet size and packet transmission time for each of the plurality of packets can be input to a communication network simulator to create trace packets corresponding to the plurality of packets. The communication network simulator output indicates at least one effect of the simulated communication network to input trace packets.

14 Claims, 4 Drawing Sheets

SYSTEM AND METHOD FOR EVALUATION OF NETWORK PERFORMANCE

BACKGROUND OF THE INVENTION

In recent years communication networks have expanded service to provide various types of data transmission in addition to voice communications, such as short message service (SMS), multimedia messaging service (MMS), electronic mail, internet browsing, etc. The growth in services has led to increased network performance requirements. In order to meet the needs of users, communication networks may be designed based on technical requirements needed to provide the various types of data transmission.

SUMMARY OF THE INVENTION

Communication network simulators have been developed to test communication network design. These simulators typically receive sample data, and the simulator converts the sample data into packets and simulates the effect of the communication network on the packets. This technique is very time consuming, and does not produce real-time results of the effect of the network on the packets.

Exemplary embodiments of the present invention are directed to systems and methods for evaluating an effect of a simulated communication network to media data. In accordance with exemplary embodiments of the present invention, media data can be encoded to produce a plurality of packets, each packet being associated with a packet index number, a packet size and a packet transmission time. The packet index number, packet size and packet transmission time for each of the plurality of packets can be input to a communication network simulator to create trace packets corresponding to the plurality of packets. The communication network simulator can provide output indicating at least one effect of the simulated communication network on the received trace packets. The media data can be decoded while accounting for the effect of the simulated communication network. The decoded media data can thus be correlated to a performance rating.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
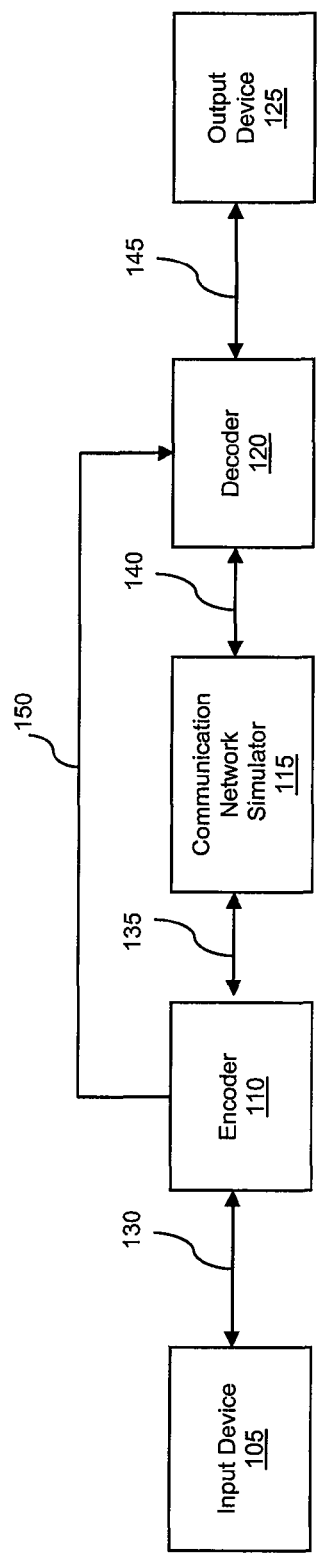
FIG. 1 is a simplified block diagram of a system in accordance with the present invention.

Referring now to the figures, FIG. 1 is a simplified system diagram of an exemplary communication network simulation system in accordance with the present invention. As illustrated, input device 105 is coupled to encoder 110 over communication link 130. Communication network simulator 115 is coupled to encoder 110 and decoder 120, over communication links 135 and 140, respectively. Further, decoder 120 is coupled to encoder 110 and output device 125 over communication links 150 and 145, respectively.

According to one embodiment of the invention, communication network simulator 115 may be configured to simulate communication of media data. For example, communication network simulator 115 can simulate the effect of communication on voice, audio, video or any type of media data in general. It should be appreciated that the simulated communication may be based on any wired and/or wireless based standard (e.g., Pulse Code Modulation (PCM), Global System for Mobile Communications (GSM), Universal Mobile Telecommunications System (UMTS), Enhanced Data Rates for Global Evolution (EDGE), High Speed Downlink Packet Access (HSPDA), High Speed Uplink Packet Access (HSUPA), Long Term Evolution (LTE), Code Division Multiple Access (CDMA), Wideband Code Division Multiple Access (WCDMA), Evolution, Data Only (EVDO), Worldwide Interoperability for Microwave Access (Wimax), etc.).

Input device 105 can provide media data, such as voice, audio, video, etc., to encoder 110, over communication link 130. Encoder 110 encodes received media data as a plurality of packets, each packet being associated with a packet index number, packet size and packet transmission time. Encoder 110 provides the packet index number, packet size and packet transmission time of each of the plurality of packets to communication network simulator 115 over communication link 135. Encoder 110 can transfer this information in real-time or all the information at one time. In accordance with exemplary embodiments of the invention, communication network simulator 115 can generate a plurality of trace packets based on the information received from encoder 110. Communication network simulator 115 generates a plurality of output trace packets that identify an effect of the simulated communication network to the packets. Based on the output trace packets, communication network simulator 115 provides an indication of the time and order of receipt of the output trace packets to decoder 120 over communication link 140. Decoder 120 receives the media from encoder 110 over communication link 150 and decodes the packets using the information provided by communication network simulator 115. In that fashion, the media can be output exhibiting at least one effect of the simulated communication network to output device 125.

In a further embodiment of the invention, output device 125 may correlate decoded media data to a performance rating, such as a subjective quality rating. For example, correlated data may be mapped to a mean opinion score (MOS) by output device 125. In that fashion, communication network simulator 115 may be evaluated. Moreover, output device 125 can provide a rating which easily indicates the quality of transmission.

Figure 2:
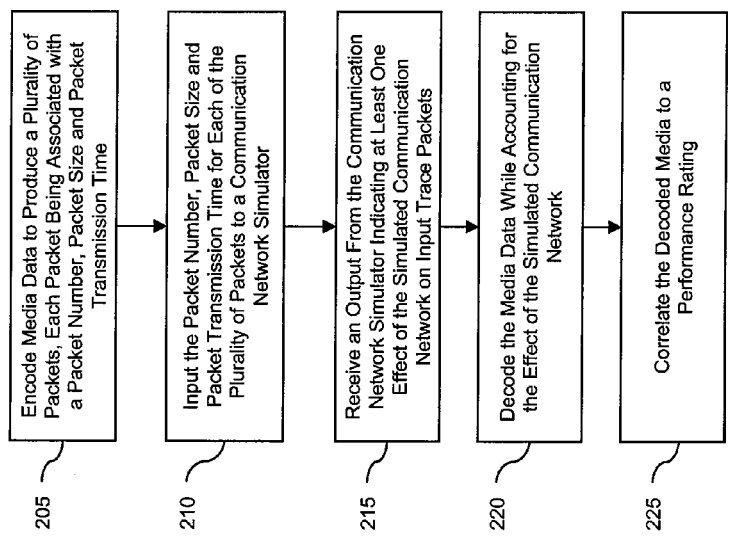
FIG. 2 is a flow diagram of an exemplary method in accordance with the present invention.
Figure 3A:
FIGS. 3A-3D are block diagrams of media data, encoded media data and representative output trace packets in accordance with the present invention.
Figure 3B:
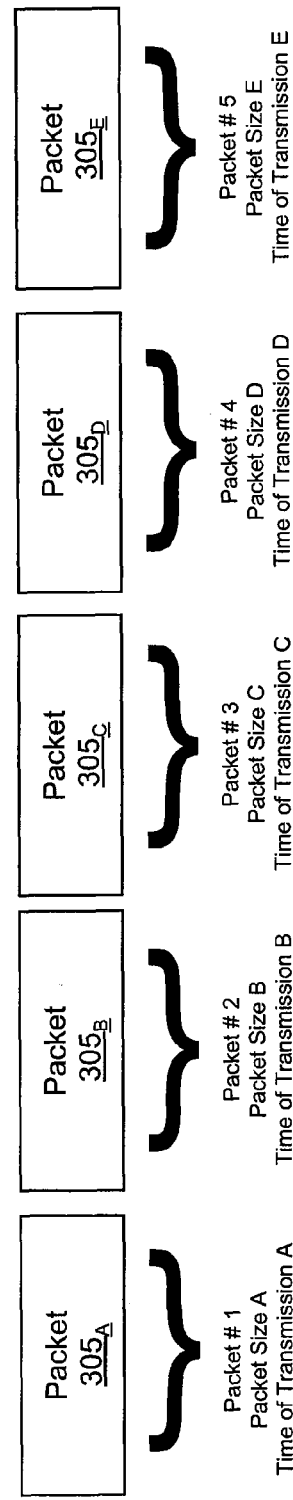

FIG. 2 is a flow diagram of an exemplary method of evaluating an effect of a simulated communication network to media data, in accordance with the present invention. Encoder 110 receives media data from input device 105 and produces a plurality of packets based on received media data such that, each of the packets is associated with a packet index number, packet size and packet transmission time (step 205). FIG. 3A illustrates exemplary media data 300, and FIG. 3B illustrates a plurality of packets 305A-305E generated by the encoder from the media data 300. Encoder 110 can employ any type of encoding technique, which can include error correction coding, error protection coding, data interleaving and/or the like. In one embodiment, the quantity, and/or size, of packets may relate to the amount of media data received. It should be appreciated that encoder 110 can produce packets for at least one of voice, text, audio, video and communication data in general.

Figure 3C:
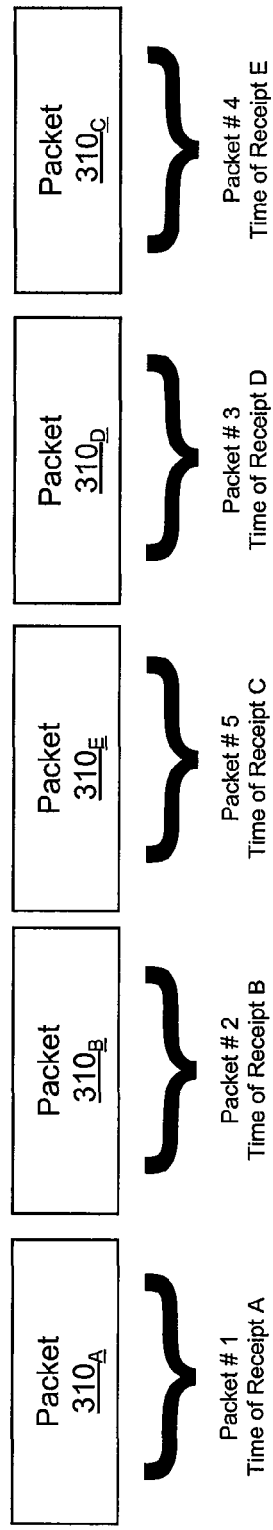

Encoder 110 provides the packet number, packet size and packet transmission time to communication network simulator 115 (step 210). Communication network simulator 115 creates input trace packets based on the packet index number, packet size and packet transmission time for each packet. According to one exemplary embodiment, the trace packets may not contain the actual media data. In that fashion, simulation of a communication network by communication network simulator 115 can process trace packets at a speed fast enough to provide real time output. Communication network simulator 115 applies the trace packets to the simulated network and produces output trace packets indicating at least one effect of the simulated communication network to input trace packets. The at least one effect may include at least one of packet loss, packet delay, jitter and a communication network impairment in general. FIG. 3C illustrates a number of output trace packets $310_A$-$310_E$. As illustrated in FIG. 3C, in this example, packet $310_E$ (packet index 5) was received prior to packets $310_C$ and $310_D$ (packet indexes 3 and 4). This could be due to, for example, the packets traveling different paths in the simulated network, and packets $310_C$ and $310_D$ (packet indexes 3 and 4) encountering more congestion than that encountered by packet $310_E$ (packet index 5). Communication network simulator 115 outputs a time and order of receipt of each of the output trace packets to decoder 120 (step 215).

Figure 3D:
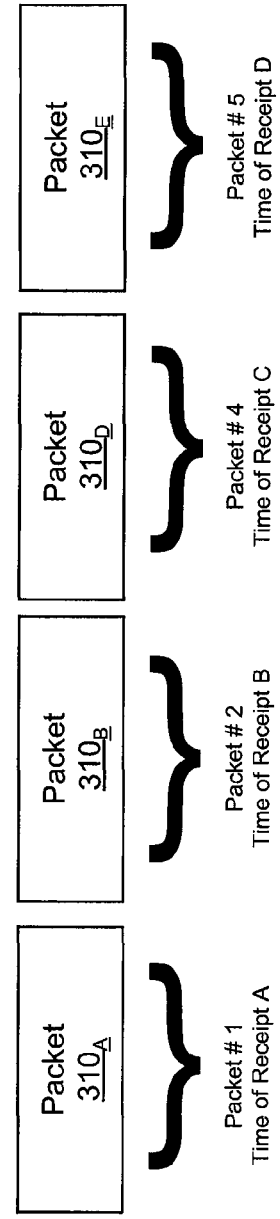

FIG. 3D illustrates another set of output trace packets that may be output by communication network simulator 115. In FIG. 3D, only output packets $310_A$, $310_B$, $310_D$ and $310_E$ (packet indexes 1, 2, 4 and 5, respectively) are received, which signifies the loss of packet $310_C$ (packet index 3). Accordingly, a time and order of receipt for packet $310_C$ is not generated by communication network simulator 115 because the packet was not output from the simulated network.

Decoder 120 decodes the media data received from encoder 110 while accounting for the effect of the simulated communication network (step 220). Specifically, decoder 120 decodes the media file using the time and order in which the output trace packets are received, which can initiate a network induced delay and degradation in media quality. Output device 125 correlates the decoded media data to a performance rating (step 225). For example, referring to the set of output trace packets of FIG. 3C, due to error protection coding, error correction coding and/or time of receipt, it may be possible for decoder 120 to accurately reproduce media data 300, even with packet $310_E$ (index 5) being received before packets $310_C$ and $310_D$ (indexes 4 and 3). Alternatively, packets $310_C$ and $310_D$ (indexes 4 and 3) may be received too late to properly employ them in the decoding process, and only packets $310_A$, $310_E$ and $310_E$ are part of the decoded media data used to produce the performance rating. Similarly, referring now to the set of packets in FIG. 3D, error protection coding and/or error correction coding may allow decoder 120 to accurately reproduce media data 300 (or reproduce such data without a noticeable effect to an end-user), even with the loss of the packet corresponding to packet index 3. It is also possible that the loss of the packet corresponding to packet index 3 can adversely affect the reproduction of media data 300.

The performance rating provided by output device 125 may relate to an objective measure of quality. Alternatively, the performance rating can relate to a subjective performance rating. For example, the correlation can relate the decoded media to a mean opinion score. It can also be advantageous for output device 125 to correlate any network induced delay and/or degradation to be associated with an acceptable, or non-acceptable, level of quality. In a further embodiment, performance ratings may be generated by output device 125 for a plurality of communication types. For example, the simulated communication network may be rated for quality based on voice communication and streaming video.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for evaluating an effect of a simulated communication network to media data, the method comprising the acts of:
    encoding, by an encoder, media data to produce a plurality of packets to encode the media data;
    generating, by the encoder, a packet index number, a packet size and a packet transmission time, separate from the plurality of packets and associated with each of the plurality of packets;
    inputting the packet index number, packet size and packet transmission time for each of the plurality of packets to a communication network simulator, wherein the communication network simulator creates trace packets based on the packet index number, packet size and packet transmission time and corresponding to the plurality of packets;
    receiving, at a decoder, from the encoder by a first communication link the plurality of packets and from the communication network simulator by a second communication link an output indicating at least one effect of the simulated communication network to the trace packets;
    decoding, at the decoder, the media data encoded in the received plurality of packets while accounting for the effect of the simulated communication network; and
    correlating the decoded media data to a performance rating.

2. The method of claim 1, wherein the media data includes at least one of voice, video and audio data.

3. The method of claim 1, wherein the output from the communication network simulator identifies a time of receipt of the trace packets.

4. The method of claim 3, further comprising determining the at least one effect based, at least in part, on the time and order of receipt of the trace packets.

5. The method of claim 1, wherein the at least one transmission effect includes at least one of packet loss, packet delay, jitter and a communication network impairment.

6. The method of claim 1, wherein the output indicating at least one effect of the simulated communication network to the trace packets is received in real time.

7. The method of claim 1, wherein correlating decoded media data to a performance rating includes translating decoded media data to at least one of a mean opinion score and a subjective performance rating.

8. A system comprising:
    an encoder which receives media data, produces a plurality of packets to encode the media data, and generates a packet index number, a packet size and a packet transmission time, separate from the plurality of packets and associated with each of the plurality of packets;
    a communication network simulator, coupled to the encoder by a first communication link, which receives the packet index number, packet size and packet transmission time by the first communication link;
generates input trace packets based on the packet index number, packet size and packet transmission time corresponding to the plurality of packets,
applies the input trace packets to a simulated communication network, and
generates output trace packets comprising an indication of at least one effect of the simulated communication network;

a decoder, which receives the plurality of packets from the encoder by a second communication link and the output trace packets from the communication network simulator by a third communication link, decodes the media data encoded in the received plurality of packets and applies the at least one effect to the decoded media data based on the output of the communication network simulator; and an output device, coupled to the decoder, that correlates the decoded media data to a performance rating.

9. The system of claim 8, wherein the media data includes at least one of voice, video and audio data.

10. The system of claim 8, wherein the output trace packets are each associated with an index number and a timestamp of receipt.

11. The system of claim 10, wherein the output device determines the at least one effect based, at least in part, on the index number and the timestamp of the output trace packets.

12. The system of claim 8, wherein the at least one transmission effect includes at least one of packet loss, packet delay, jitter and a communication network impairment in general.

13. The system of claim 8, wherein a communication interface outputs the media data in real time.

14. The system of claim 8, wherein the decoded device translates output media data to at least one of a mean opinion score and a subjective performance rating in general.

* * * * *